Jan. 6, 1942.  F. D. KINNEY ET AL  2,268,599
ABRADING TOOL
Filed April 22, 1938
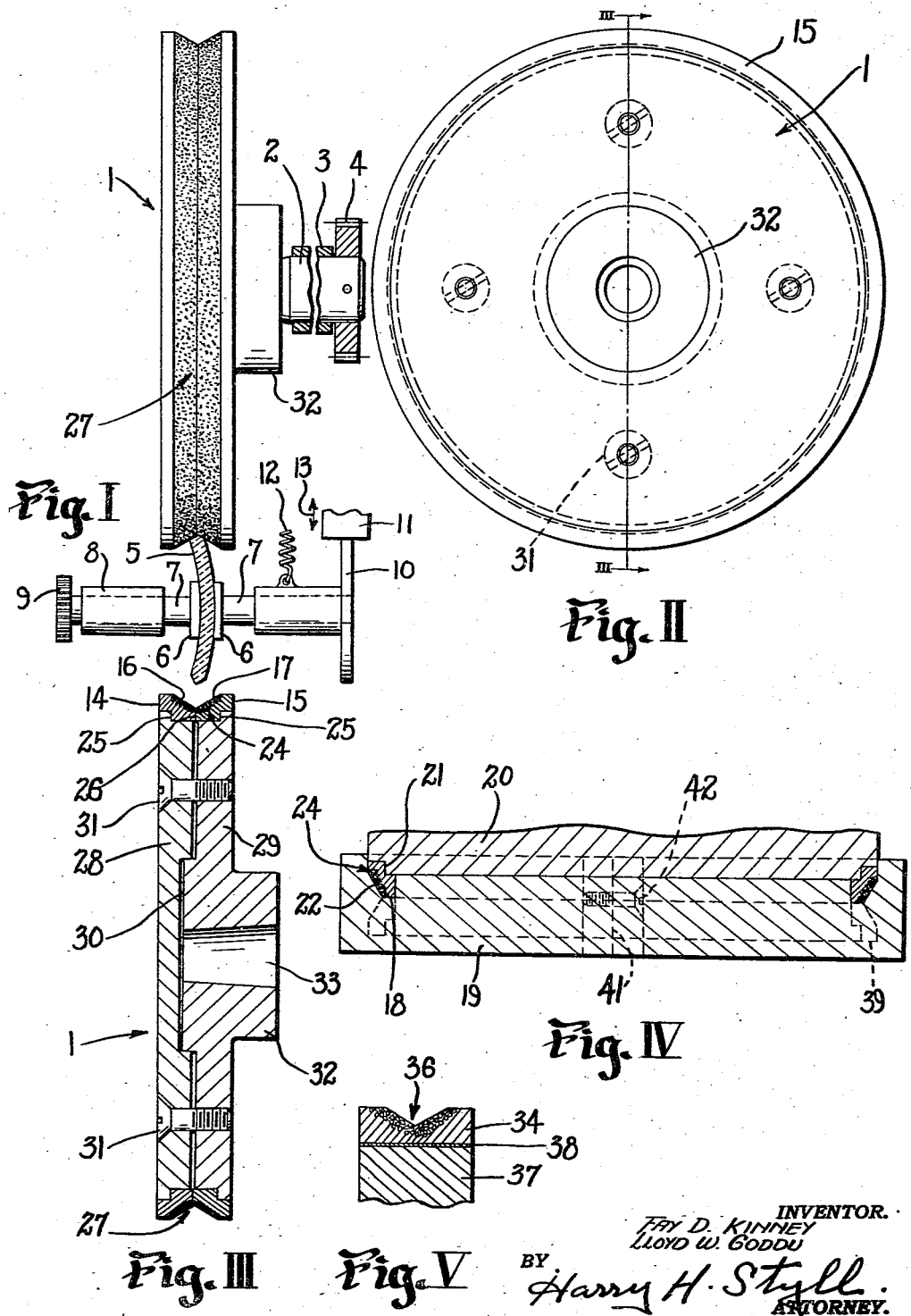
INVENTOR.
FAY D. KINNEY
LLOYD W. GODDU
BY Harry H. Styll
ATTORNEY.

Patented Jan. 6, 1942

2,268,599

UNITED STATES PATENT OFFICE 2,268,599

ABRADING TOOL

Fay D. Kinney and Lloyd W. Goddu, Southbridge, Mass., assignors to American Optical Company, Southbridge, Mass., a voluntary association of Massachusetts Application April 22, 1938, Serial No. 203,578

2 Claims. (Cl. 51—206)

This invention relates to improvements in abrading tools and has particular reference to a novel tool and method of making the same.

One of the principal objects of the invention is to provide an abrading tool for shaping the contour edges of lenses and has particular reference to a novel tool and method of making the same which will be exceptionally resistant to wear and highly efficient in its function.

Another object is to provide an abrading tool for beveling the edges of lenses wherein both surfaces of the bevel may be formed simultaneously and which will permit the forming of a sharp apex on the bevel by feeding the edge of the lens directly into the bevel forming edge of the tool.

Another object is to provide a tool of the above character having its effective abrading surface impregnated with abrasive particles and method of making the same.

Another object is to provide an abrading tool of the above character with an interchangeable effective abrading portion.

Other objects and advantages of the invention will become apparent from the following description taken in connection with the accompanying drawing and it will be apparent that many changes may be made in the various details of construction, arrangement of parts and methods shown and described without departing from the spirit of the invention as expressed in the accompanying claims. We, therefore, do not wish to be limited to the exact details, arrangemens and methods shown and described, as the preferred form only has been set forth by way of illustration.

Referring to the drawing:

Fig. I is a diagrammatic view of the device embodying the invention showing an edge view of the abrading tool and illustrating some of the associated parts of the device;

Fig. II is a side elevation of the tool;

Fig. III is a sectional view taken as on line III—III of Fig. II and looking in the direction indicated by the arrows;

Fig. IV is a fragmentary sectional view illustrating a step in the process of manufacture; and Fig. V is a fragmentary sectional view of a modified form of the invention.

Many attempts have been made in the past to provide an abrading tool having a V-shaped groove therein for forming a V-shaped bevel on the edges of lenses.

In most instances in the past such tools were formed of compositions which were quite susceptible to wear and which required special truing mechanism for compensating for said wear and for truing the effective abrading surface of the tool.

Due to the relatively quick wearing nature of most of these prior art tools it was not possible to feed the work directly into the beveled face of the tool. This was due to the fact that the apex of the bevel soon became rounded and the resulting bevel formed on the lens was likewise rounded and inefficient in its function.

The usual procedure, with most prior art tools, was to dispose the edge of the lens being abraded at such an angle relative to the beveled groove of the tool as to avoid having the lens touch the apex of the bevel. This required a special mechanism and of course did not avoid the difficulties encountered with the constantly changing diameter of the tool due to wear. The result therefore in most instances in the past was that the sizes of the finished lenses could not be positively controlled so that a desired standard could be maintained in the sizes of lens rims of ophthalmic mountings in which such lenses are retained in position before the eyes.

The present invention, therefore, is directed more particularly to the provision of an abrading tool of the type having a V-shaped groove therein which is more resistant to wear and which is quick and accurate in its function and by which the resultant bevel and size of the finished lens may be more positively controlled.

Referring more particularly to the drawing wherein like characters of reference designate like parts throughout the several views, the device embodying the invention comprises broadly an abrading tool 1 carried by a shaft 2 mounted in the bearing 3 and rotated by a gear 4 connected with any suitable source of power not shown. The lens or work 5 is carried between suitable clamping jaws 6 mounted on shafts 7 and rotated in suitable bearings 8 by a gear connection 9 to the source of power. The shaft 7 opposite the gear 9 has a suitable former 10 secured thereto which engages an adjustable contact shoe 11 for controlling the size and resultant contour shape of the lens 5. Suitable means such as a spring 12 urges the former 10 toward and into engagement with the contact shoe 11 and simultaneously urges the work 5 toward the abrading tool 1. The device described above is of the conventional type used in supporting the lens in desired relation with the abrading tool of the device.

The contact shoe 11 is adjustable in the direction indicated by the arrow 13 so that the size of the lens may be controlled. It is apparent that if the contact shoe 11 is adjusted rearwardly the lens or work 5 will move in a direction further toward the face of the tool with the result that more of the edge of the lens or work will be removed and the resultant diameter of the lens will be decreased.

The abrading tool as shown in Figs. III and IV comprises a pair of annular members 14 and 15 each having an angled surface 16 and 17 impregnated with abrasive particles such as crushed diamonds, sapphires, Carborundum, etc., formed by placing a mixture of pulverized metal and abrasive particles in a pre-shaped annular groove 18 formed in a block 19 and compressing the same in said block by a plunger 20 having an edge face 21 shaped to complete the contour shape desired of the annular member. It will be noted that the groove 18 is provided with an angled wall 22 which shapes the surfaces 16 and 17 to the desired angle.

After the pulverized metal and abrasive particles have been compressed, as illustrated in Fig. IV, they are subjected to heat of a temperature sufficient to cause the pulverized particles to sinter and thereby form an integral structure with the abrasive particles anchored therein.

The abrasive particles may be distributed throughout the entire annular portion or may be distributed only throughout the effective abrading surface of the tool, as illustrated at 24.

Each of the annular members thus formed has a shouldered edge 25, and side surfaces 26 which are adapted to be faced and fitted in contiguous relation with each other, as illustrated in Fig. III. The said annular members are used in pairs and when in fitted relation with each other form the beveled circumferential groove 27 of the tool. The said annular members are supported in fitted relation with each other by opposed clamp plates 28 and 29 having shouldered edge portions fitting with the inner shoulders 25 of the annular members. The said plates 28 and 29 have a male and female connection 30 for maintaining them in desired aligned relation with each other and are secured in this relation by suitable connecting means such as screws or other desirable means 31. One of the plate members is provided with a shank 32 having a tapered opening 33 therein which is adapted to fit on a suitable tapered end formed on the shaft 2.

It is apparent that, although the preferable method of forming such an abrading device is described above, the said impregnated abrasive surfaces 16 and 17 and supporting annular portions thereof may be formed on a single annular body portion 34, as illustrated in Fig. V, that is, the said body portion may be a ring-like member having a V-shaped circumferential groove 36 therein instead of being formed by two separate annular members 14 and 15. It is also apparent that a single supporting disc 37 might be fitted within the annular member 34 and that the said annular member 34 could be held on said disc 37 by a solder connection or the like 38, or other suitable means. In the latter instance, it would be apparent that a suitable split mold in which the annular member 34 may be formed could be provided. This could be accomplished by forming a block such as illustrated at 19 in Fig. IV with a recess including a shaped portion, such as illustrated by dotted lines at 39, and by splitting the said block 19 into two sections divided centrally along diametrically opposed lines such as illustrated at 40. Suitable means, such as clamps or screws shown dotted at 42, could be used for securing the divided sections of the block in proper relation with each other during the molding and sintering operation.

Some of the metals which might be used in forming the tool are as follows:

Iron, iron alloys, nitralloy, bronzes, copper, etc.

In some instances, when beryllium bronze or metal of a similar nature is used, it may be subsequently heat treated to modify its physical characteristics if desired. The body portion of the annular members formed by such pulverized particles of metal will have a porous nature.

The pressure during molding and the temperature during the sintering is carefully controlled to be sure that the degree of porosity is such that the particles of abrasive will be positively retained in said body portion during the use thereof. By this it is meant that the size of the pores must be controlled so as to be less than the size of the abrasive particles held by said pulverized metal so as to insure a more positive holding action.

The faces 16 and 17 impregnated with the abrasive particles may be etched with a suitable acid, such as hydrofluoric acid, or subjected to an abrading to remove a controlled amount of the metal of the body portion surrounding said abrasive particles so as to cause a portion of the cutting edges of said particles to be exposed.

If desired the annular portions 14 and 15 may be hardened a controlled amount to render the metal of the tool more resistant to wear. It is to be understood that the desired degree of hardness is to be such that the wear of the metal will substantially keep pace with the wear of the abrasive particles so as to more positively insure that the abrasive particles do not become dislodged and displaced from the tool prior to performing the full extent of their usefulness. The degree of hardness also should be controlled so that it will not be too hard and result in the face of the tool scaling over and losing its effectiveness.

It is also apparent that if desired, instead of forming the portions 34 and 37 separately, the entire main body portion of the tool may be formed simultaneously with the forming of the impregnated face 36 of the tool.

During the use of the device it is to be understood that the work or lens 5 may be fed gradually into the bevel of the tool 1, or may be fed directly into the tool to the depth desired or to a depth sufficient to permit the former 10 to engage the contact shoe 11 and, after which, the said lens may be rotated one complete revolution, with the tool 1 rotating at a higher speed than the lens and functioning as a gang cutter or milling tool, for removing the excess material at the edge of the work or lens and simultaneously shaping the said edge to the desired V-shape.

With tools of the character described above it is possible to feed the edge of the lens or work 5 directly into the bevel of the tool, as illustrated in Fig. I, and because of the high resisting characteristics of the tool to wear, a bevel having a sharp apex may be formed on the lens or work. The tool performs the beveling operation very quickly and efficiently and because of its resistance to wear enables a more accurate control of the desired size of the lens or work.

From the foregoing description it will be seen that simple, efficient and economical means and methods have been provided for accomplishing all of the objects and advantages of the invention.

Having described our invention we claim:

1. An abrading tool comprising an annular portion of a width greater than its thickness formed essentially of sintered metallic particles having a V-shaped groove in the peripheral surface thereof and having opposed inner shouldered edge portions, said peripheral surface having only the V-shaped groove therein impregnated with particles of abrasive intermingled with the metallic particles adjacent said bevelled surfaces and secured therein by the sintered relation of said metallic particles, a pair of disc-like members each having a peripheral shouldered portion interfitted with the shouldered edge portions of the annular member, one of said disc-like members having a recess therein and the other a protrusion on one side thereof interfitting in said recess and a protrusion on the opposed side thereof with a tapered bore and means for securing said disc-like members together with the shouldered peripheral portions thereof clampingly engaging the shouldered edges of said annular portion, said disc-like members being of a solid metal different than the metallic particles of the annular portion.

2. An abrading tool comprising an annular portion of a width greater than its thickness formed essentially of sintered metallic particles having a V-shaped groove in the peripheral surface thereof and having opposed inner shouldered edge portions, said peripheral surface having only the V-shaped groove therein impregnated with particles of abrasive intermingled with the metallic particles adjacent said bevelled surfaces and secured therein by the sintered relation of said metallic particles, a pair of disc-like members each having a peripheral shouldered portion interfitted with the shouldered edge portions of the annular member, one of said disc-like members having a recess therein and the other a protrusion on one side thereof interfitting in said recess and a protrusion on the opposed side thereof with a tapered bore and means for securing said disc-like members together with the shouldered peripheral portions thereof clampingly engaging the shouldered edges of said annular portion, said disc-like members being of a solid metal different than the metallic particles of the annular portion, said annular portion comprising separate members fitted in side surface relation with each other to complete the V-shaped groove.

FAY D. KINNEY.
LLOYD W. GODDU.